United States Patent [19]

Yamada et al.

[11] 4,051,888

[45] Oct. 4, 1977

[54] LOW TEMPERATURE ENERGY CARRYING APPARATUS AND METHOD

[75] Inventors: Tatsunori Yamada, Kyoto; Shigeru Mori, Sakai; Kaoru Kato, Hirakata; Yasuyuki Arai, Osaka; Katumi Sakitani, Kawachinagano, all of Japan

[73] Assignee: Daikin Kogyo Co., Ltd., Osaka, Japan

[21] Appl. No.: 646,833

[22] Filed: Jan. 5, 1976

Related U.S. Application Data

[63] Continuation-in-part of Ser. No. 485,998, July 5, 1974, abandoned.

[30] Foreign Application Priority Data

July 7, 1973   Japan .................................. 48-76751

[51] Int. Cl.$^2$ ............................................ F28D 15/00
[52] U.S. Cl. .................................... 165/1; 60/655; 62/4; 126/263; 165/107; 165/DIG. 17
[58] Field of Search ............... 62/4, 8, 10, 12–14, 62/40, 58, 66–68, 71; 23/273 R, 273 F; 165/107, 1; 126/263

[56] References Cited

U.S. PATENT DOCUMENTS

| 3,243,966 | 4/1966 | Glew ........................................... 62/4 |
| 3,514,274 | 5/1970 | Cahn et al. ............................ 62/12 X |

*Primary Examiner*—Leland A. Sebastian
*Attorney, Agent, or Firm*—Cushman, Darby & Cushman

[57] ABSTRACT

A low temperature energy carrying apparatus and method adapted for central cooling which comprises a hydrate circulating system for a liquid hydrate agent and hydrate crystals incorporated with a conventionally designed water circulating system. In the hydrate circulating system, the hydrate crystals are feed to the users side together with cooled water and decomposed therein into hydrate agent and cooled water absorbing the latent heat of decomposition. Therefore, the temperature of the cooled water during transport thereof to the users side is stabilized and in addition to the sensible heat of the cooled water the latent heat of the hydrate crystals can be utilized in the users side, thereby improving cooling effect in the users side. Also, the hydrate circulating system is adapted to use a hydrate agent in the liquid phase area which allows the operation of the system to be stabilized.

7 Claims, 4 Drawing Figures

LOW TEMPERATURE ENERGY CARRYING APPARATUS AND METHOD

CROSS-REFERENCE TO THE RELATED APPLICATION

This is a Continuation-in-part of U.S. No. 485,998 filed on July 5, 1974, now abandoned.

BACKGROUND OF THE INVENTION

This invention relates to a low temperature energy carrying apparatus and method and more specifically to low temperature energy carrying apparatus and method adapted for central cooling, which comprises a hydrate circulating system for a liquid hydrate agent and hydrate crystals incorporated with a conventionally designed water circulating system.

Hitherto, in an apparatus for producing a large quantity of heat energy and transferring the same to users in a wide area, such as a central cooling or heating system, it has been common practice to use water as a low or high temperature energy carrying medium, so as to utilize the sensible heat of water for cooling or heating (In carrying high temperature energy for heating, occasionally, latent heat of water is utilized.). In the case of carrying low temperature energy for cooling, the temperature difference ($\Delta T_c$) in the water between the feeding course (temperatures from 5° to 7° C) and the return course (temperatures from 12° to 14° C) is:

$$\Delta T_c = 7° \sim 8° C$$

and therefore, a quantity of transferred energy ($Q_c$) is:

$$Q_c = 7 \sim 8 \text{ Kcal/kg}$$

In the case of carrying high temperature energy for heating, temperature difference ($\Delta T_H$) in water between the feeding course (temperatures from 180° to 120° C) and the return course (temperatures from 120° to 80° C) is:

$$\Delta T_H = 40° \sim 60° C$$

and therefore, a quantity of transferred energy ($Q_H$) is:

$$Q_H = 40 \sim 60 \text{ Kcal/kg.}$$

These facts show that:

1. In the case of carrying low temperature energy, unless a piping diameter is extremely large as compared with a diameter of piping for carrying high temperature energy, there is produced a shortage of heat energy to be supplied, and 2. In the case of carrying low temperature energy, since the temperature differences is $\Delta T_C = 7° \sim 8°$ C, heat loss arising in the feeding course directly incurs an undesirable temperature rise in the cooled water, resulting in a failure to feed cooled water at a stable temperature to the terminal loads.

SUMMARY OF THE INVENTION

To overcome the drawbacks above described, it is a primary objection of the present invention to provide a low temperature energy carrying apparatus comprising: a first water circulating system including a hydrate agent separating means disposed in the side of low temperature energy supply and having a water cooling means, at least one heat exchange means disposed in the side of users, feed conduit means connecting said hydrate agent separating means to said heat exchange means, return conduit means connecting said heat exchange means to said hydrate agent separating means, and a pump means disposed in said feed conduit means; a hydrate circulating system for circulating a liquid hydrate agent and hydrate crystals incorporated with said first water circulating system and: a second water circulating system incorporated with said first water circulating system and said hydrate circulating system; said hydrate circulating system including a hydrate crystal producing means disposed in the supply side, a hydrate crystal decomposing means disposed in the users side, feed conduit means connecting said hydrate crystal producing means to said hydrate crystal decomposing means, and return conduit means connecting said hydrate crystal decomposing means through said hydrate agent separating means to said hydrate crystal producing means, said second water circulating system including said hydrate crystal decomposing means and said heat exchange means disposed in the users side, feed conduit means connecting said hydrate crystal decomposing means to said heat exchange means, and return conduit means connecting said heat exchange means to said hydrate crystal decomposing means and including a pipe and a branch pipe therefrom for receiving part of heated water flowing in said pipe and returning the part to said hydrate crystal decomposing means, said three circulating system being incorporated such that hydrate crystals discharged through said feed conduit means from said hydrate crystal producing means are mixed with cooled water from said hydrate separating means at least several percent thereof and are fed through said feed conduit means to said hydrate crystal decomposing means and then said hydrate crystals decompose in said hydrate crystal decomposing means to effect cooling of said part of heated water returned through said return conduit means from said heat exchange means by absorbing latent heat upon decomposition, said cooled water being fed through said feed conduit means to said heat exchange means together with said cooled water from said hydrate agent separating means, while liquid hydrate agent formed in said hydrate crystal decomposing means is returned through said return conduit means to said hydrate agent separating means together with the remaining part of heated water from said heat exchange means, said liquid hydrate agent being separated from said heated water in said hydrate agent separating means and returned through said return conduit means to said hydrate crystal producing means, and further said pump means allowing the pressure in said hydrate circulating system to be maintained in the liquid phase area of said hydrate agent.

In the apparatus mentioned in the above, it is preferable that said hydrate crystal producing means, when the specific gravities of the hydrate agent, hydrate crystal and water are lower in the order given, includes a hydrte crystal crusher provided in the mid portion thereof, an agitator provided in the lower portion thereof, means for injecting toward said agitator from below thereof cooled water partially fed from said hydrate agent separating means, and means for injecting toward said agitator from above thereof hydrate agent fed through a hydrate agent cooling means disposed in said return conduit means from said hydrate agent separating means whereby cooled water and cooled hydrate agent are agitated to produce hydrate crystals, which are then crushed into small pieces by said hydrate crystal crusher while unreacted hydrate agent contained in said crystals is separated therefrom said hydrate crystals being discharged through said feed conduit means.

Another object of the present invention is to provide a process of carrying low temperature energy employing water as a low temperature energy carrying medium comprising cooling water in the side of cooled water supply, feeding said cooled water to the side of users having at least one heat exchange means, and returning the water heated by said heat exchange means to said supply side for further circulation, wherein the improvement comprising: producing hydrate crystals in the supply side; introducing said hydrate crystals into said water circulation in the supply side to feed the hydrate crystals to the users side as a mixture of cooled water and hydrate crystals of at least several percent thereof; dehydrating said hydrate crystals in the users side with said heated water being cooled; and returning the dehydrated hydrate agent together with said heated water to the supply side for further circulation, the pressure in said hydrate agent and crystals circulation being maintained in the liquid phase area of the hydrate agent.

In the process mentioned in the above, it is preferable that said hydrate agent is $C_3H_8$, $CHFCl_2$, $CFCl_3$, $CO_2$, $CF_3Br$, $N-C_4H_{10}$, or $i-C_4H_{10}$.

DETAILED DESCRIPTION OF THE INVENTION

Description will hereunder be given of a preferred embodiment, which is employed for a central cooling system, in conjunction with the accompanying drawings.

Figure 1:
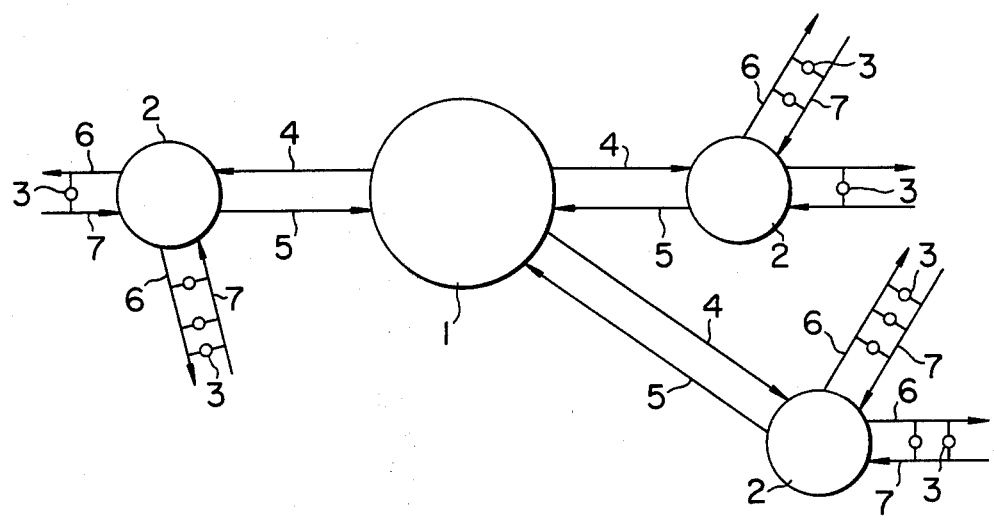
FIG. 1 is a diagrammatical view showing a low temperature energy carrying apparatus according to the present invention.

Referring to FIG. 1, shown at 1 is a low temperature energy generating mechanism, which is installed as a main plant on the low temperature energy supply side and provided at a single spot substantially in the center of the district cooling area. Designated as 2 are auxiliary low temperature energy generating mechanism, each of which is provided as a sub-plant on the side of the users and in the vicinity of the district cooling plant, and from each of which feed pipes 6 and return pipes 7 extend to a plurality of terminal loads for cooling 3 (heat exchange device such as air conditioners installed in the respective houses), so that cooled water may be fed thereto and returned therefrom. Between the aforesaid main plant 1 and respective sub-plants 2, there are provided with feed pipes 4 and return pipes 5. Thus, the main plant 1, sub-plants 2, loads for cooling 3, feed pipes 4, return pipes 5, feed pipes 6 and return pipes 7 constitute a low temperature energy carrying system.

Figure 2:
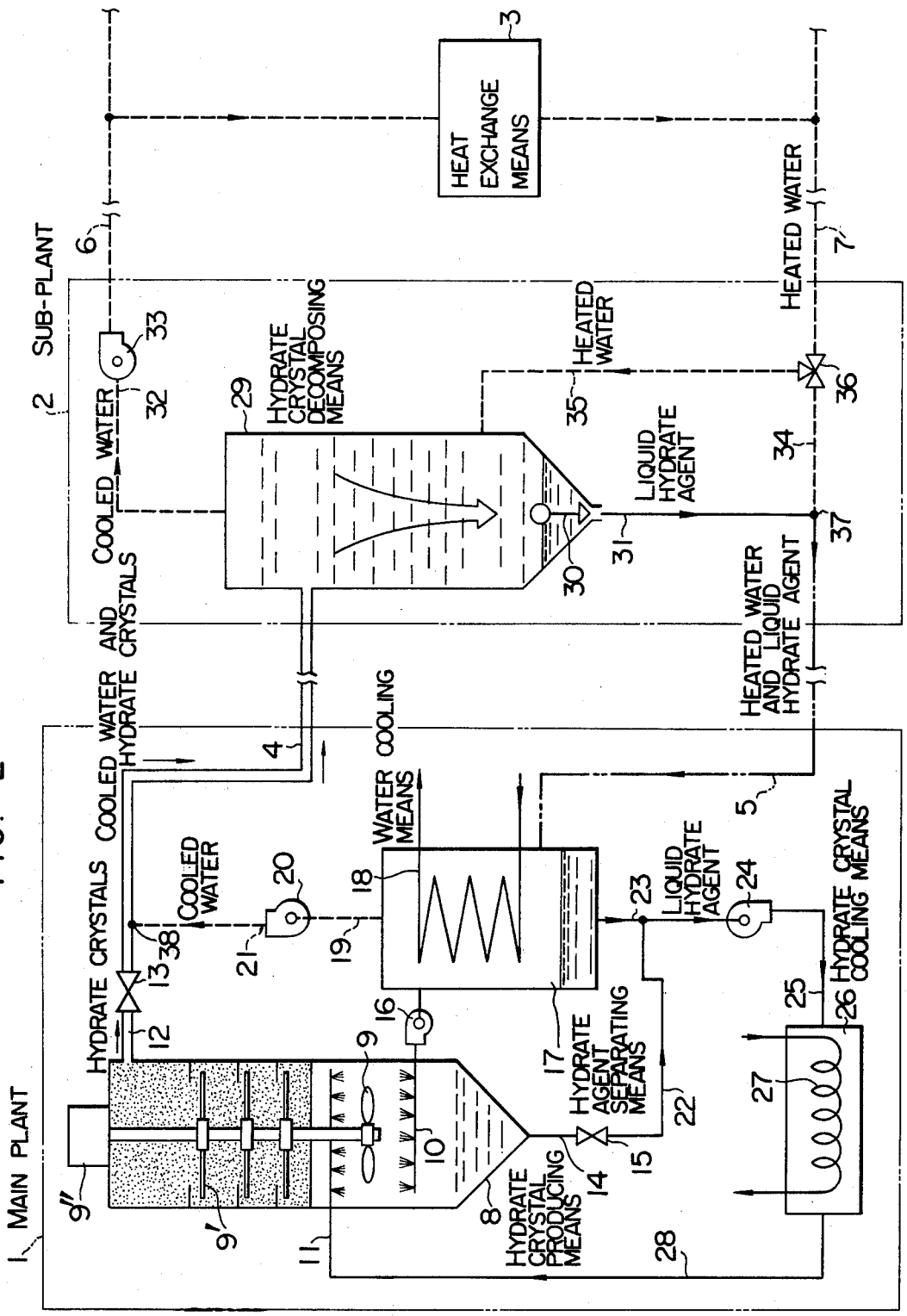
FIG. 2 is a circuit diagram showing in detail, the essential parts of the low temperature energy carrying apparatus of FIG. 1.

The mechanisms of the main plant 1 and sub-plant 2 are illustrated in detail in FIG. 2. The main plant 1 includes a hydrate agent separating device 17 and a hydrate crystal producing device 8 and other auxiliary devices, while the sub-plant 2 includes a hydrate crystal decomposing device 29, and other auxiliary devices.

The main plant 1 equipped with the hydrate agent separating device 17 functions to cool the heated water as well as to separate the hydrate forming agent from the heated water. Cooled water is fed thorugh the feed pipe 4, via the hydrate crystal decomposing device 29 arranged in the sub-plant 2, to the feed pipe 6 and the loads to be cooled 3, in which cooled water is heat-exchanged into heated water. The heated water is then returned through the return pipes 7 and 5 to the aforesaid hydrate agent separating device 17. Thus, the first water circulating system is prepared. The first water circulating system is the same as the conventional system, except for the aforesaid hydrate agent separating device 17 and hydrate crystal decomposing device 29.

The hydrate circulating system which constitutes the major feature of the present invention is such that hydrate agent separated from heated water in the aforesaid hydrate agent separating device 17 provided on the main plant 1 side is crystallized in the hydrate crystal producing device 8 and carried via the feed pipe 4 leading to the sub-plant 2, to the hydrate crystal decomposing device 29 for decomposing the hydrate crystals into hydrate agent and water, which hydrate crystal decomposing device is arranged on the sub-plant side 2, and then returned, via a hydrate agent return pipe 31 and the return pipe 5 leading to the main plant 1, to the hydrate agent separating device 17.

The relationship between the hydrate circulating system and the first water circulating system is as follows. Hydrate crystals are mixed, within the feed pipe 4 located on the main plant 1, with cooled water flowing in the first water circulating system, and then hydrate crystals and cooled water are both carried via the feed pipe 4 to the hydrate crystal decomposing device 29 on the subplant 2. In the hydrate crystal decomposing device 29, hydrate crystals are decomposed into hydrate agent and water while the cooled water is further cooled due to decomposition of hydrate crystals, and the hydrate agent and the cooled water flow out from the hydrate crystal decomposing device 29 separately in such a manner that cooled water flows through the feed pipe 6 and hydrate agent flows through the return pipe 31. The aforesaid cooled water is heat-exchanged in the load for cooling 3 into heated water. The heated water flows via the return pipe 7 to join with hydrate agent at the junction point 37 and then returned via the return pipe 5 to the hydrate agent separating device 17, in which heated water is separated from hydrate agent and cooled by a cooling coil 18, so that the cooled water may then be fed to the first water circulating system, while the hydrate agent is fed to the hydrate circulating system. The aforesaid circulations of cooled water and hydrate crystals are cyclically repeated.

It should be noted that the pressure in the aforesaid hydrate circulating system are maintained in the liquid phase area of the hydrate agent so as to prevent gasification of the hydrate agent and crystals. The maintenance of the pressure is effected by selecting suitably a pump pressure at the time when cooled water is fed from the separating device 17 by means of a pump 20.

The temperature and pressure to maintain the hydrate agent in the liquid phase area are varied due to a kind of the hydrate agent, and the details thereof will be apparent from the later description with respect to FIG. 3, but the main point is to hold the hydrate agent above the condensation line X in FIG. 3. In case that the distance from the supply side (main plant) to the users side (sub-plant) is very long as is in the present invention, a certain pump pressure is required in order to carry medium overcoming a long-piping resistance. For this reason, the maintenance of the pressure is obtained without using any special boosting means. Accordingly, a stabilized cooling effect is always obtained.

Figure 3:
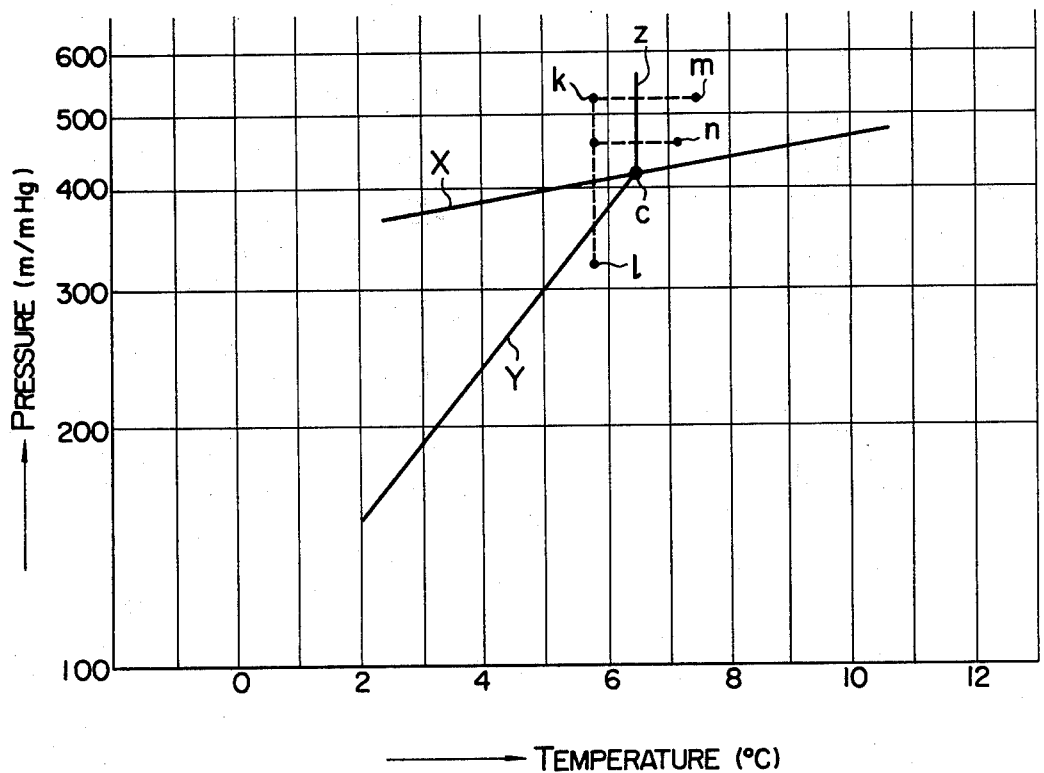
FIG. 3 is a temperature-pressure equilibrium diagram showing the conditions of producing hydrate crystals and hydrate agent.

Further, as seen from FIG. 3, the hydrate crystal producing line Z of the hydrate agent in the liquid phase is substantially vertical and therefore the temperature upon production or decomposition of hydrate crystals is constant even if the pressure is somewhat varied due to piping resistance and the like, which secures a stabilized cooling effect of the apparatus as comparing the case using a gaseous hydrate agent.

Further, there is provided a second cold water circulating system which is provided on the users side and which is so constructed that cooled water is carried, via the hydrate crystal decomposing device 29 and the feed pipe 6, to the load for cooling 3 and heat-exchange therein into heated water, and the heated water flows through the return pipe 7, then partly divided midway of the return pipe 7 to be returned via a branch return pipe 35 to the hydrate crystal decomposing device 29, thus providing the second water circulating system. The relationship of the second water circulating system with respect to the aforesaid first water circulating system and the hydrate circulating system is as follows. The above-described three circulating systems are joined together in the hydrate crystal decomposing device 29. Cooled water and heated water from the first and second water circulating systems are mixed together within the hydrate crystal decomposing device 29 to react with hydrate crystals from the hydrate circulating system. The water thus mixed is further cooled due to latent heat of decomposition of hydrate crystals. The cooled water of the first and second cold water circulating systems is all fed via the feed pipe 6 to the load for cooling 3. Then, part of the heated water is divided midway of the return pipe 7 to be returned to the hydrate crystal decomposing device 29, thus providing the second water circulating system. While, the other part of the heated water is carried through the return pipe 5 to the hydrate separating device 17, thus forming the first water circulating system. The hydrate circulating system is the same as is set forth in the foregoing.

The major feature of the present invention exists in the combination of the first water circulating system, the hydrate circulating system and the second water circulating system, each of which is outlined in the foregoing. Respective components of those three systems will be described in detail, from which other features as well as the afore-described feature of the present invention will be more apparent.

Although hydrate forming agent used in the present invention will be described later, reference will be made to the case where Freon R-11 is used as a hydrate forming agent, i.e. the case where the specific gravities are reduced in the decreasing order of hydrate agent, hydrate crystal and water.

The main plant 1 is composed of the hydrate crystal producing device 8, the hydrate agent separating device 17, pumps 16 and 20 for water circulation, a pump 24 for hydrate agent circulation, a hydrate agent cooling device 26 and a cooling unit consisting of a compressor, condenser, evaporator and etc., which are not shown.

The hydrate crystal producing device 8 is a closed container which has a pipe 12 provided in the upper portion and connected by way of a flow control valve 13 to the feed pipe 4, and a pipe 14 provided in the bottom portion, to which pipe is connected a stop valve 15. The hydrate crystal producing device 8 houses therein a crystal crusher 9' disposed centrally thereof and rotated by an electric motor 9'', an agitator 9 disposed in the lower portion, a water injection nozzle 10 disposed below the aforesaid agitator 9, and a hydrate injection nozzle 11 disposed in the mid portion between the aforesaid crystal crusher 9' and the aforesaid agitator 9, the aforesaid two injection nozzles being arranged to provide a counter-flow of water against the hydrate, and vice versa.

The hydrate agent separating device 17 is a closed container, which houses a cooling coil 18 submerged in the upper water layer and communicating with the evaporator of the aforesaid cooling unit. The hydrate agent separating device 17 has a top end communicated, by way of a pipe 19, a water circulating pump 20 and a pipe 21, with the feed pipe 4, an upper side portion communicated by way of a water circulating pump 16 with the aforesaid water injection nozzle 10, a lower side portion communicated with the return pipe 5, and a bottom portion communicated by way of a pipe 23 with the intake side of a hydrate agent pump 24.

The pipe 23 and the stop valve 15 are communicated with each other by way of a pipe 22. The discharge side of hydrate agent pump 24 is communicated by way of a pipe 25 with the hydrate agent cooling device 26.

The hydrate cooling device 26 is a closed container which involves therein a cooling coil 27 communicated with the evaporator of the aforesaid cooling unit. The hydrate cooling device 26 is communicated by way of a pipe 28 with the hydrate agent injection nozzle 11.

The sub-plant 2 comprises the hydrate crystal decomposing device 29 as a major component. The hydrate crystal decomposing device 29 has an upper side portion communicated with the feed pipe 4, a top portion communicated by way of a pipe 32 and a water circulating pump 33 with the feed pipe 6, and a lower side portion communicated by way of a pipe 35 with one outlet port of three-way valve 36, whose inlet port is connected to the return pipe 7. The hydrate crystal decomposing device 29 further has a bottom opening, in which a float valve 30 is provided, and which is communicated by way of a pipe 31 with the return pipe 5 at the junction point 37, at which point the pipe 31 and the return pipe 5 are joined together.

The other outlet port of the aforesaid three-way valve 36 is communicated by way of a pipe 34 with the junction point 37 and the return pipe 5.

Referring in detail to the hydrate circulating system, the circulating system is composed of the following components arranged in the order of the hydrate separating device 17, pipe 23, hydrate agent pump 24, pipe 25, hydrate agent cooling device 26, pipe 28, hydrate agent injection nozzle 11, hydrate crystal producing device 8, pipe 12, flow control valve 13, feed pipe 4, hydrate crystal decomposing device 29, pipe 31 and return pipe 5. By the provision of the hydrate circulating system, cooled water containing hydrate crystal, rather than the cooled water alone, is used as a low temperature energy carrying medium, said cooled water containing at least several percent of hydrate crystals which are mixed, at the junction point 38, with the cooled water from the first water circulating system.

The hydrate crystals herein referred to are those of a hydrocarbon group to be exemplified below and compounds tending to be gasified at room temperature and under normal atmospheric pressure, which are classified structurally as clathrate among various hydrates bonded with water to produce crystals. By the compounds which produce hydrate crystals, i.e. hydrate agent, are meant those which are insoluble with water and whose boiling point is below 60° C. Included as hydrate agents are propane ($C_3H_8$), R-21 ($CHFCl_2$), R-11 ($CFCl_3$), carbon dioxide ($CO_2$), R-13$B_1$ ($CF_3Br$), normal butane (N-$C_4H_{10}$), and isobutane (i-$C_4H_{10}$). Besides those compounds, there may be used $CH_4$, $C_2H_2$, $C_2H_4$, $C_2H_6$, $CH_3Cl$, $CH_3Br$, $CF_2Cl_2$, $CF_2ClBr$, $CH_2FCl$, $CH_2F_2$, $CHF_2Cl$, $N_2O$, $SO_2$, $H_2S$, $PH_3$, $Cl_2$, $Br_2$, A, Kr, Xe and Ne or the like. These hydrate agents react with wter under a certain pressure and at a certain temperature to produce hydrate crystals containing water of $7\frac{2}{3}$, $5\frac{3}{4}$ or 17 mol to hydrate agent of 1 mol, generating heat of formation from 80 to 100 kcal/kg.

Assuming M is representative of hydrate agent, then the molecular formula of hydrate crystal is: M.$7\frac{2}{3}$ $H_2O$, M.$5\frac{3}{4}$ $H_2O$ or M.17 $H_2O$.

The hydrate crystals are readily decomposed into water and hydrate agent by reducing the pressure, or applying heat thereto, or by applying heat as well as reducing pressure, absorbing heat of decomposition equivalent to the aforesaid quantity of heat of formation.

Referring now to a temperature-pressure equilibrium diagram shown in FIG. 3 for explaining the hydrate crystal and hydrate agent producing conditions (the hydrate agent used is R-11), the line X passing the critical point C(6.5° C, 410 mmHg) represents a condensation line, in the upper area of which the liquid hydrate agent remains stable while in the lower area of which gaseous hydrate agent remains stable. The lines Y and Z respectively represent the hydrate crystal producing lines, in which hydrate crystals are produced from gaseous hydrate agent or liquid hydrate agent and water. In the left-hand area of the lines Y and Z, hydrate crystals remain stable.

As is apparent from the diagram, hydrate crystals can be stably produced if hydrate agent (R-11) and water are maintained at a temperature lower than 6.5° C and under pressure higher than 410 mmHg. When hydrate crystals are produced, heat of formation of approximately 80 kcal/kg generates.

When the hydrate crystals are in the condition $k$, if pressure is reduced to the level $l$, the hydrate crystals are decomposed into gaseous hydrate agent and water; if heat is applied upto the condition $m$, the hydrate crystals are decomposed into liquid hydrate agent and water; and if pressure is reduced and heat is applied into the condition $n$, the hydrate crystals are decomposed into liquid hydrate agent and water. In either case, such hydrating action absorbs latent heat of decomposition (at 80 kcal/kg).

In the embodiment shown, there is exemplified a mechanism in which pressure reduction due to the piping resistance and heat application are regulated to provide the condition $n$.

It should be noted that in order to hold the liquid phase area of the hydrate agent in the hydrate circulating system of the present invention, the pressure in the system must be above the condensation line X in FIG. 3, however the present invention overcomes this problem by using a preselected hydrate agent such as R-11 of which the liquid phase area is maintained, without using any special booster means, with the pump 20 applying pressure for conducting circulation of water, hydrate agent and hydrate crystals against piping resistance.

If the temperature and presence of the hydrage circulating system are maintained in the hydrate liquid phase area, the latent heat of the hydrate crystals is stably imparted to the heat carrying medium in addition to the sensible heat of the cooled water and thus it is possible to increase the quantity of transferred heat per unit quantity of heat carrying medium, resulting in improved efficiency in the carriage of low temperature energy. If the ratio of hydrate crystals to water is properly selected, it is possible with ease to restrain the increase in the viscosity of the water substantially to a negligibly small extent to obtain a proper order of viscosity when hydrate crystals are mixed with water. Thus, increase in the piping resistance is avoided to a large extent. For example, when R-11 is used as the hydrate agent (whose specific gravity is 1.5 in hydrate agent and 1.2 in hydrate crystal), and the content of hydrate crystals to water is 10% by weight, the specific gravity becomes about 1.02 and the hydrate crystals exhibit a tendency to float on water, so that the piping resistance is only increased very little, as compared with that in the case of water only.

Operation of the low temperature energy carrying apparatus will be described with reference to FIG. 2. In this example, R-11 is used as the hydrate agent. Hydrate crystals (at approximately 6.5° C) produced in the hydrate crystal producing device 8 are carried through the pipe 12 and flow control valve 13 to mix at point 38 with cooled water (at 5° C) into a low temperature liquid mixture (at 6.5° C) containing several % of hydrate crystals, said cooled water being fed by way of the pipe 19, pump 20 and pipe 21 from the hydrate agent separating device 17 in which heated water is separated from the hydrate agent and cooled by the cooling coil 18, and then the low temperature liquid mixture is fed by way of the feeding pipe 4 to the sub-plant 2.

In the hydrate crystal decomposing device in the sub-plant 2, the low temperature liquid mixture receives heat of decomposition from the heated water at about 13.5° C which water has been subjected to heat exchange in the load for cooling 3 and enters into the device 29 flowing from the load for cooling through the return pipe 7 to be divided at the three-way valve 36 into the pipe 35, whereby hydrate crystals are decomposed into hydrate agent and water, simultaneously with the temperature of the heated water being dropped. Consequently, the hydrate agent (whose specific gravity is 1.5) and the cooled water which is thus produced due to decomposition are separated into two layers above and below due to the difference in specific gravity within the device 29. Cooled water (at 6.5° C) flows out from the device through the pipe 32 provided on the top portion thereof, while the hydrate agent flows out from the device through the pipe 31 having float valve 30.

Cooled water at 6.5° C flowing through the pipe 32 is fed under the action of the pump 33 to the load for cooling 3 to effect cooling therein, and then part of the heated water is returned to the hydrate crystal decomposing device 29, thus completing circulation through the second water circulating system. The aforesaid cycle of circulation is repeated, thereby cooling the load for cooling 3.

As is apparent from the foregoing, water alone is circulated between the sub-plant 2 and the load for cooling 3, and quantity of water circulating therethrough is equivalent to a quantity of water which is converted from an amount of hydrate crystals to be mixed in the first water circulating system. Heated water fed through the load for cooling 3 is divided by means of the three-way valve 36 at a proper rate to flow to the pipe 35 and to the pipe 34. The rate is such that a quantity of water corresponding to a quantity of water coming through the feed-pipe 4 is distributed to the pipe 34 and the rest is fed to the hydrate crystal decomposing device 29.

In other words, since the quantities of energy to be transferred by hydrate crystals and cooled water are 80 kcal/kg and 7 to 8 kcal/kg, respectively, if 5% (by weight) of hydrate crystal is contained in the cooled water, the quantity of energy to be transferred from the supply side through the first water circulating system will be 1 : 2 in the ratio of hydrate crystals to cooled water, and the rate of water to be distributed to the pipe 35 and the pipe 34 will be 1 : 2. If 10% of hydrate crystals are contained in the cooled water, the rate will be 1 : 1.

The return water (13.5° C) flowing through the pipe 34 and hydrate agent (13.5° C) flowing through the pipe 31 are mixed at the junction point 37 and then returned by way of the return pipe 5 to the hydrate separating device 17. In the hydrate separating device 17, heated water thus returned thereto is cooled to a low temperature of about 5° C by the cooling coil 18 and at the same time, separated into a cooled water upper layer and a hydrate agent lower layer due to differences in specific gravity, thereby providing discrete layers within the hydrate resparating device 17. Thus, the hydrate agent is carried by way of the pipe 23 to the cooling device 26, while cooled water is fed through the pipe 19 to the feeding pipe 4, except for part of the cooled water being carried to the hydrate crystal producing device 8. The cycle of the above-described circulation is repeated.

The hydrate agent at 5° C or thereabout flowing through the pipe 23 is mixed with the hydrate agent at about 6.5° C which remains uncrystallized in the hydrate crystal producing device 8 and is introduced from the bottom of device to the pipe 14, stop valve 15 and pipe 22. The hydrate agent thus mixed is then carried under pressure by the pump 24 through the pipe 25 to the hydrate agent cooling device 26. In the hydrate agent cooling device 26, the hydrate agent is cooled by the cooling coil 27 to a temperature from 2° to 3° C and then enters into the hydrate agent injection nozzle 11 by way of the pipe 28.

In this case, since cooled water is separated from the hydrate agent in the hydrate separating device 17, even if temperature of hydrate agent is below the crystallization temperature, no hydrate crystals are produced until the hydrate agent is agitated with water within the hydrate crystal producing device 8.

In the meantime, part of the cooled water flows out of the hydrate separating device 17 by way of the water circulating pump 16 to enter the water injection nozzle 10, from which the cooled water is injected within the hydrate crystal producing device 8. Thus, the injected cooled water and low temperature hydrate agent at 2° to 3° C provide a counter-flow, thereby being admixed together within the hydrate crystal producing device 8. During the above process, the aforesaid low temperature hydrate agent tends to move downwards while cooled water tends to move upwards, because the hydrate agent is higher in specific gravity than water. Thus, the hydrate agent and cooled water are completely agitated by the agitator 9 located in the mid portion of the device to react with each other, whereby hydrate crystals are produced.

The hydrate crystals thus produced, however, contain a large quantity of unreacted hydrate agent, because the crystals are produced in the hydrate agent. Those hydrate crystals are crushed into pieces by the crystal crusher 9' provided above the agitator 9, so that unreacted hydrate agent contained in those crystals may be separated therefrom. Due to the difference in specific gravity between the hydrate crystal (1.2) and hydrate agent (1.5), the unreacted hydrate agent thus separated moves downwards within the hydrate crystal producing device 8, while the hydrate crystals move upwards. The hydrate crystals, whose temperature is raised to 6.5° C due to heat of formation, are carried by way of the pipe 12, to be mixed at 38 with cooled water flowing through the pipe 21 and then carried through the feed pipe 4, as set forth in the foregoing. The hydrate agent which remains unreacted in the hydrate crystal producing device 8 is warmed to about 6.5° C due to heat of formation and returned, in turn, via the pipe 14, stop valve 15, pipe 22, pump 24, pipe 25, hydrate agent cooling device 26, pipe 28 and hydrate agent injection nozzle 11, to the hydrate crystal producing device 8. Heat of formation is absorbed by cooled water coming from the hydrate separating device 17 and by the hydrate agent cooling device 26.

Through repetition of the above-described circulating cycle, hydrate crystals and cooled water are produced in the main plant 1, then mixed together, and then fed via the feed pipe 4 to the users side, whereby carriage of low temperature energy to the load for cooling 3 is achieved at high efficiency. While, in the sub-plant 2, the low temperature energy is efficiently fed to the load for cooling 3.

As is apparent from the foregoing, according to the present invention, hydrate crystals produced on the supply side are mixed on the supply side with water in the known first water circulating system. Accordingly, latent heat of decomposition and sensible heat are both held in the low temperature energy carrying medium. Thus, where cooled water containing hydrate crystals needs to be carried over a long distance, even if the piping is relatively defective in heat insulation, there a temperture rise in the cooled water to more than the decomposing temperature of hydrate used (for example, 6.5° C at 410 mmHg in hydrate R-11, 8.7° C at 760 mmHg in R-21, 14.8° C at 1140 mmHg in methyl bromide, 1.5° C at 793 mmHg in n-butane, and 2.8° C at 1300 mmHg in i-butane) is avoided. In addition, the temperature level of the cooled water is variable by selecting a hydrate agent from among various hydrate agents exemplified in the foregoing depending upon the objects. Thus, cooled water at a required temperature is surely carried to remote destination points, with its temperature maintained constant, irrespective of ambient conditions.

In this regard, in the conventional low-temperature energy carrying apparatus using cooled water alone circulating through the first water circulating system, a temperature rise in the cooled water during the carriage of low temperature energy is inevitable due to ambient temperature conditions, and thus cooled water being distributed to loads for cooling 3 is unstable in temperature. On the contrary, according to the present invention, the temperature of the low temperature energy carrying liquid is stabilized, with the assurance of a stabilized cooling function.

Furthermore, as compared with the case where the low temperature energy is carried by only water, efficiency in the carriage of heat energy is improved by an extent corresponding to the latent heat generated at the time of decomposition of the hydrate crystals, and hence the quantity of transferred heat per unit quantity of low temperature carrying medium is increased. This is obvious from the plot of FIG. 4, in which the line I represents that the quantity of transferred energy Q (kcal/kg) increases in proportion to the increase in the percentage content of hydrate crystals mixed therein.

Figure 4:
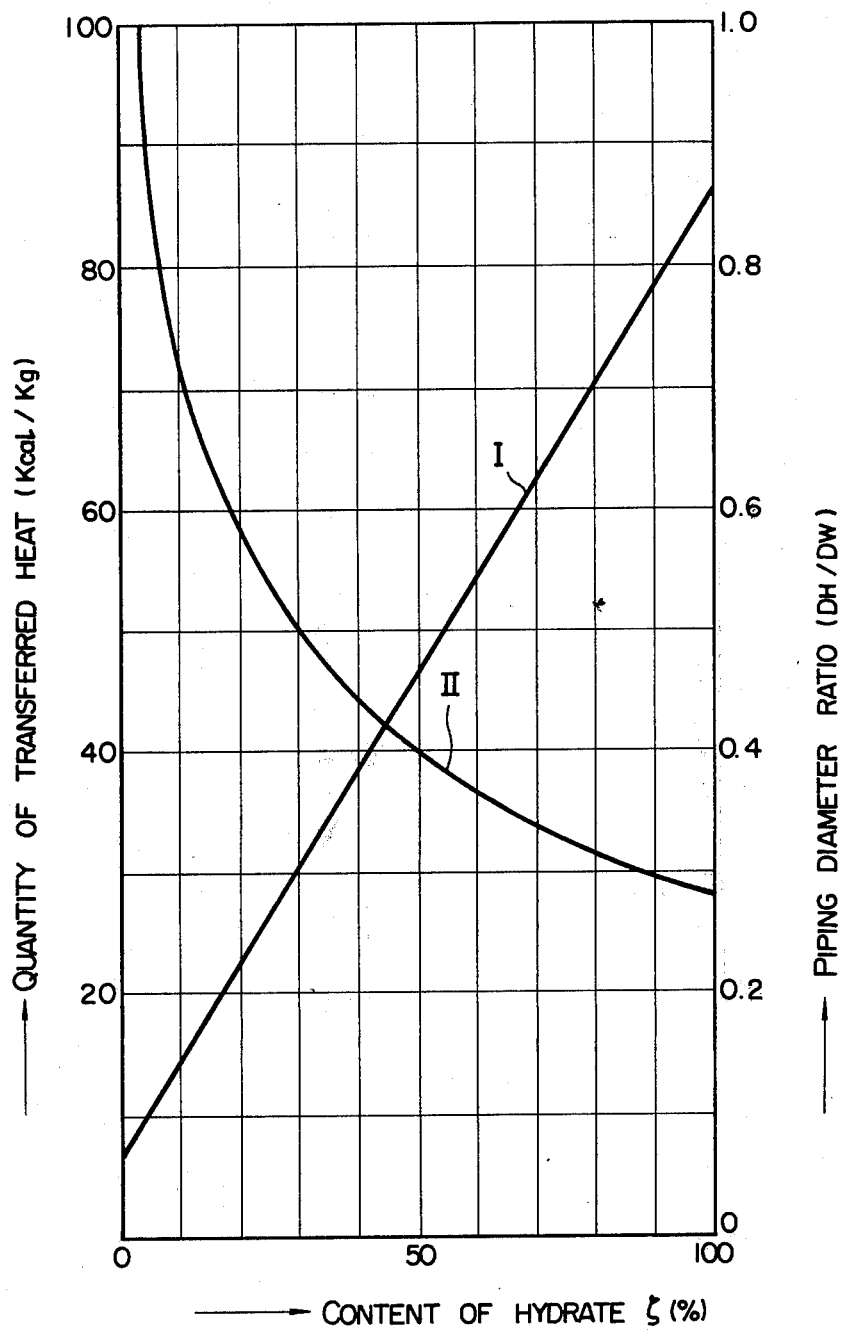
FIG. 4 is a plot showing the relationship between the content of hydrate crystals, quantity of transferred heat and piping diameter ratio, which is shown for illustrating the effect of the present invention.

In other words, this shows that in the carriage of cooled water containing hydrate crystals, the diameter of piping for carrying the low temperature energy carrying liquid is reduced, as compared with the diameter of piping for carrying the same amount of cooled water alone. This greatly contributes to reducing the cost of the equipment, particularly where extremely long piping is required as in the apparatus for effecting district cooling. The line II in the plot of FIG. 4 represents the relationship between the variation in the content of hydrate crystals mixed with cooled water and the piping diameter ratio, i.e. a ratio ($D_H/D_W$) of the piping diameter ($D_H$) for carrying cooled water containing hydrate crystals to the piping diameter ($D_W$) for carrying water alone. It is apparent that, with an increase in a content of hydrate crystals mixed (%), the piping diameter ratio ($D_H/D_W$) is abruptly decreased. For example, if 10% of hydrate crystals are mixed with the cooled water, the diameter of the piping for carrying the low temperature energy is reduced to 70% of the diameter of piping for carrying only water. If 20% of hydrate crystals are mixed, the piping diameter is reduced to 60%. Those values have been obtained under the conditions where the temperature of the low temperature energy carrying medium is 6.5° C when in the feeding course, and is 13.5° C when in the return course, and R-11 is used as hydrate agent.

Also, according to the present invention the temperature and pressure in the hydrate circulating system is maintained in the liquid phase area of the hydrate agent to prevent gasification of hydrate agent and hydrate crystals. This leads to reduction of the diameter of piping comparing the case where gaseous hydrate agent is used as a low temperature energy carrying medium. Furthermore, since the production and decomposition of the hydrate crystal in the appartus in the liquid phase are of the hydrate agent is effected under a constant temperature even if the pressure in the apparatus is somewhat varied by a piping resistance and the like, a stabilizing cooling effect of the load for cooling 3 is always obtained.

Further, the hydrate crystals decomposing device 29 is provided midway of the first water circulating system and midway of the piping for carrying hydrate crystal containing liquid, so that hydrate crystals produced on the supply side may be decomposed into water and hydrate agent within the hydrate crystal decomposing device 29, thereby giving off latent heat of decomposition. Thus, the cooled water alone circulates, as the cooling medium, through the second water circulating system, so that commercially availed instruments may be connected to the piping of the load for cooling 3 and the circulating system, without the necessity of preparing a special instrument, thereby no extracharges for equipment are imposed on the users. Furthermore, if the amount of hydrate crystals to be fed to the hydrate crystal decomposing device 29 and a dividing ratio of return water at 36 are properly selected, the second water circulating system may serve as the main cooling circuit.

In addition, the present invention provides that for facilitating production of hydrate crystals in the hydrate crystal producing device 8, a hydrate agent whose temperature is raised due to heated water heat-exchanged on the users side is preliminarily separated from the water in the hydrate separating device 17, and thereafter the same is cooled, so that hydrate agent is cooled to a low temperature to a satisfactorily (should the hydrate agent contain water, water would be turned into ice to cling to the cooler, and hence hydrate agent could not be cooled to a required low temperature).

Furthermore, according to the present invention, when cooled water and hydrate agent are agitated within the hydrate crystal producing device 8, if the specific gravity is small in the order of hydrate agent, hydrate crystal and water (for example in the order or R-11, hydrate crystals of R-11 and water), a hydrate agent high in specific gravity is injected from aove of the agitator 9 and cooled water low in specific gravity is injected from below thereof, so that hydrate agent high in specific gravity will tend to move downwards, while cooled water low in specific gravity will tend to move upwards. Hence this improves the agitating performance, so that production of hydrate crystals is promoted. The hydrate crystals produced move upwards within the hydrate crystal producing device 8, because their specific gravity becomes lower than the hydrate agent due to crystallization, and then are crushed into pieces by the crystal crusher 9' in the mid portion of the hydrate crystal producing device 8, and at the same time untreated hydrate agent in the hydrate crystals are separated and the hydrate crystals thus crushed into pieces are fed, together with cooled water, from the upper portion of the hydrate crystal producing device 8 of the pipe for circulation. This contributes to increasing the cooling effect of the low temperature energy medium circulating through the apparatus.

The above-description is given to the case where the specific gravities of hydrate agent, hydrate crystal and water are lower in the order given. On the contrary, in the case where the specific gravities of water, hydrate crystal and hydrate agent are lower in the order given, (for example in the order of water, n-butane hydrate crystal, and n-butane) the differences in specific gravity among them is utilized likewise. In this case, by reversing the relative positions of layers of hydrate agent, hydrate crystals and water within the hydrate separating device 17, hydrate crystal producing device 8, and hydrate crystal decomposing device 29, respectively, the intended object will be achieved in a like manner to the preceding embodiment.

Furthermore, according to the present invention, in carrying low temperature energy, the sensible heat of the cooled water and latent heat of the hydrate crystals are carried altogether simultaneously, so that the diameter of piping used for low temperature energy transfer is reduced to about 70% of the piping diameter for carrying cooled water only, in the case when the content of hydrate crystals is 10%, and reduced to about 60% in case where the content of hydrate crystals is 20%, resulting in a reduction in costs to a greater extent in large scale equipment in district cooling. Furthermore, the quantity of heat per unit quantity of low temperture energy carrying medium is increased and cooled water stabilized in temperature is fed to loads for cooling, independently of the influence due to heat loss in the course of the carriage of low temperature energy. Since separation of the mixed liquid into hydrate agent and water as well as production of hydrate crystals are ensured, the apparatus provides a remarkable effect particularly for large scale cooling such as the case of district cooling in which stabilized cooling and highly efficient operation for cooling are desired.

Last, the use of the low temperature energy carrying apparatus of the present invention is not limited to central cooling. The apparatus can be used for transferring low temperature energy where there is a great distance from the supply side to the users side in a cooling system other than district cooling.

What is claimed is:

1. A low temperature energy carrying apparatus comprising: a first water circulating system including a hydrate agent separating means (17) in which the hydrate agent is $CH_3H_8$, $CHFCl_2$, $CFCl_3$, $CO_2$, $CF_3Br$, $n\text{-}C_4H_{10}$ or $i\text{-}C_4H_{10}$ disposed in the side of low temperature energy supply and having a water cooling means (18), at least one heat exchange means (3) disposed in the side of users, feed conduit means (19, 21, 4, 32, 6) connecting said hydrate agent separating means (17) to said heat exchange means, return conduit means (7, 34, 5) connecting said heat exchange means (3) to said hydrate agent separating means (17), and a pump means (20) disposed in said feed conduit means (19, 21); a hydrate circulating system for circulating a liquid hydrate agent and hydrate crystals incorporated with said first water circulating system and: a second water circulating system incorporated with said first water circulating system and said hydrate circulating system; said hydrate circulating system including a hydrate crystal producing means (8) disposed in the supply side, a hydrate crystal decomposing means (29) disposed in the users side, feed conduit means (12, 4) connecting said hydrate crystal producing means (8) to said hydrate crystal decomposing means (29), and return conduit means (31, 5, 23, 25, 28) connecting said hydrate crystal decomposing means (29) through said hydrate agent separating means (17) to said hydrate crystal producing means (8), said second water circulating system including said hydrate crystal decomposing means (29) and said heat exchange means (3) disposed in the users side, food conduit means (32, 6) connecting said hydrate crystal decomposing means (29) to said heat exchange means (3), and return conduit means (7, 25) connecting said heat exchange means (3) to said hydrate crystal decomposing means (29) and including a pipe (7) and a branch pipe (35) therefrom for receiving part of heated water flowing in said pipe (7) and returning the part to said hydrate crystal decomposing means (29), said three circulating systems being incorporated such that hydrate crystals discharged through said feed conduit means (12) from said hydrate crystal producing means (8) are mixed with cooled water from said hydrate separating means (17) at at least several percent thereof and are fed through said feed conduit means (4) to said hydrate crystal decomposing means (29) and then said hydrate crystals decompose in said hydrate crystal decomposing means (29) to effect cooling of said part of heated water returned through said return conduit means (7, 35) from said heat exchange means (3) by absorbing latent heat upon decomposition, said cooled water being fed through said feed conduit means (32, 6) to said heat exchange means (3) together with said cooled water from said hydrate agent separating means (17), while liquid hydrate agent formed in said hydrate crystal decomposing means (29) is returned through said return conduit means (31, 5) to said hydrate agent separating means (17) together with the remaining part of heated water from said heat exchange means (3), said liquid hydrate agent being separated from said heated water in said hydrate agent separating means (17) and returned through said return conduit means (23, 25, 28) to said hydrate crystal producing means (8), and further said pump means (20) allowing the pressure in said hydrate circulating system to be maintained in the liquid phase area of said hydrate agent.

2. The apparatus in accordance with claim 1, wherein said hydrate crystal producing means (8), when the specific gravities of the hydrate agent, hydrate crystal and water are lower in the order given includes a hydrate crystal crusher (9') provided in the mid portion thereof, an agitator (9) provided in the lower portion thereof, means (10) for injecting toward said agitator (9) from below thereof cooled water partially fed from said hydrate agent separating means (17), and means (11) for injecting toward said agitator (9) from above thereof hydrate agent fed through a hydrate agent cooling means (26) disposed in said return conduit means (25, 28) from said hydrate agent separating means (17) whereby cooled water and cooled hydrate agent are agitated to produce hydrate crystals, which are then crushed into small pieces by said hydrate crystal crusher (9') while unreacted hydrate agent contained in said crystals is separated therefrom said hydrate crystals being discharged through said feed conduit means (12).

3. In a process of carrying low temperature energy employing water as a low temperature energy carrying medium comprising cooling water in the side of cooled water supply, feeding said cooled water to the side of users having at least one heat exchange means, and returning the water heated by said heat exchange means to said supply side for further circulation, the improvement comprising: producing hydrate crystals in the supply side; introducing said hydrate crystals into said water circulation in the supply side to feed the hydrate crystals to the users side as a mixture of cooled water and hydrate crystals of at least several percent thereof; dehydrating said hydrate crystals in the users side with said heated water being cooled; and returning the dehydrated hydrate agent together with said heated water to the supply side for further circulation, the pressure in said hydrate agent and crystals circulation being maintained in the liquid phase area of hydrate agent.

4. In a process of carrying low temperature energy employing water as a low temperature energy carrying medium comprising cooling water in the side of cooled water supply, feeding said cooled water to the side of users having at least one heat exchange means, and returning the water heated by said heat exchange means to said supply side for further circulation, the improvement comprising: producing hydrate crystals in the supply side; introducing said hydrate crystals into said water circulation in the supply side to feed the hydrate crystals to the users side as a mixture of cooled water and hydrate crystals of at least several percent thereof;

dehydrating said hydrate crystals in the users side with said heated water being cooled; and returning the dehydrated hydrate agent together with said heated water to the supply side for further circulation, the pressure in said hydrate agent and crystals circulation being maintained in the liquid phase area of hydrate agent wherein said hydrate agent is $C_3H_8$, $CHFCl_2$, $CFCl_3$, $CO_2$, $CF_3Br$, $n$-$C_4H_{10}$, or $i$-$C_4H_{10}$.

5. In a heat exchange apparatus comprising a water cooling chamber (17) having a water cooling means (18),
  a heat exchange means (3) for conducting heat exchange by cooling a source of heat,
  a first conduit system including conduit means (4, 32, 19, 21 and 6) joining the cooling chamber (17) to said heat exchange (3) means for feeding cooled water to said heat exchange means (3), wherein said conduit means (4) is in communication with (32), said conduit means (32) being in communication with conduit means (6);
  a second conduit system including conduit means (7, 34 and 5) joining said heat exchange means (3) to said cooling chamber for returning heated water for contact with said cooling means (18), wherein conduit means (7) is in communication with conduit means (34), conduit means (34) being in communication with conduit means (5),
  the improvement comprising a circulating system for circulating a liquid hydrate agent which is $C_3H_8$, $CHFCl_2$, $CFCl_3$, $CO_2$, $CF_3Br$, $n$-$C_4H_{10}$ or $i$-$C_4H_{10}$, and cooled water while maintaining said agent and said cooled water each in a separate liquid phase, including a hydrate crystal producing means (8) for producing hydrate crystals from cooled water and liquid hydrate agent, said hydrate crystal producing means (8) being in communication with said conduit means (4) and being in communication with said second conduit means (5) through said cooling chamber whereby cooled water containing at least several weight percent of hydrate crystals is mixed in said first conduit means (4) and fed therethrough to said heat exchange means (3) through (24), while returning from load 3 through 7 at least a portion of dehydrated liquid hydrate agent and heated water are returned from said hat exchange means (3) through said second conduit means (5), which further includes a hydrate agent separating means (17) for separating said dehydrated liquid hydrate agent from said heated water, said hydrate agent separating means (17) connecting said conduit means (5) to said first conduit means (4) and housing said cooling means (18), said hydrate agent separating means (17) having a hydrate agent return pipe means (23) in communication with said hydrate crystal producing means (8) for returning separated liquid hydrate agent thereto, which further includes a hydrate crystal decomposing means (29) for decomposing said hydrate crystals into water and liquid hydrate agent, said hydrate crystal decomposing means (29) interposed in said conduit means (4 and 32) between said cooling means (18) and said heat exchange means (3), said first conduit means (4) being in communication with said hydrate crystal decomposing means (29) to feed cooled water-containing hydrate crystals, said hydrate crystal decomposing means (29) provided with two discharge means wherein one of said discharge means (31) in communication with said second conduit means (5) receives dehydrated liquid hydrate agent and the other discharge means (32) in communication with said heat exchange means (3) receives cooled water, said hydrate crystal decomposing means (29) further provided with a heated water return pipe means (35) in communication with said second conduit means (5) for partially returning hated water from said heat exchange means (3) to said hydrate crystal decomposing means (29).

6. In a process for heat exchange employing water as the heat exchange medium comprising
  a. cooling water;
  b. passing said cooled water to a source of heat which is to be cooled; and
  c. recycling water warmed by said source of heat to step (a) the improvement comprising including the step (d) of contacting said water with hydrated material, which is a hydrate of $C_3H_8$, $CHFCl_2$, $CFCl_3$, $CO_2$, $CF_3Br$, $n$-$C_4H_{10}$ and $i$-$C_4H_{10}$, whereby heat from the water acts to dehydrate said hydrated material and thus cause said water.

7. The process of claim 6, wherein said step (d) is undertaken after step (b).

* * * * *